UNITED STATES PATENT OFFICE 2,642,449

PREPARATION OF POLYISOCYANATES

Marion G. Morningstar, Charles S. Schollenberger, and Grant E. Stueber, Cuyahoga Falls, Ohio, assignors to The B. F. Goodrich Company, New York, N. Y., a corporation of New York No Drawing. Application October 18, 1951,
Serial No. 252,002

16 Claims. (Cl. 260—453)

This invention relates to the preparation of organic polyisocyanates and more particularly pertains to an improved method for preparing organic polyisocyanates by the reaction of phosgene with primary polyamines or acid salts thereof.

It is well known that phosgene will react with amines and salts of amines to produce isocyanates. It is also known that this reaction with a free amine also produces a urea, but when an acid salt of an amine is employed as reactant there is no urea formed. This reaction, however, particularly when applied to polyamines or their salts, for the production of polyisocyanates, has heretofore been difficult to carry out in an efficient manner. It has required reaction times of the order of 20 to 40 hours and has resulted in yields of polyisocyanate no greater than about 60 to 70%.

We have discovered however that organic polyisocyanates can be prepared in yields of from 80% to 95% and higher in about two hours or less, and in many instances in but a few minutes, depending upon the capacity of the reaction equipment. These results are obtainable by mixing together an excess of phosgene with a primary polyamine or an acid salt thereof in a closed reactor, heating the reactants to an elevated temperature of from 100° C. to 200° C., at superatmospheric pressure while removing the volatile reaction by-product, that is, hydrogen chloride, substantially as rapidly as formed. The unreacted phosgene is removed from the reaction medium and the polyisocyanate is recovered. It has been found to be advantageous to add the phosgene to the primary amino reactant, that is, the primary polyamine or acid salt thereof, in the closed reactor at a temperature of from 10° to 30° C. The entire reaction can be carried out in the presence or the absence of an inert reaction diluent as will be hereinafter described and illustrated.

The term "superatmospheric pressure" as herein employed refers to a pressure in excess of atmospheric pressure and, more specifically, refers to a pressure of from about four atmospheres to a pressure corresponding to the total vapor pressure of the reaction medium at the reaction temperature.

The general overall reactions involved in the process of this invention can be illustrated by the following reaction equations where para phenylene diamine and para phenylene diamine hydrochloride are employed to illustrate the polyamino reactant.

(I)
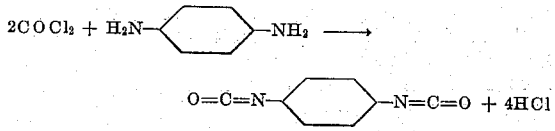

(II)
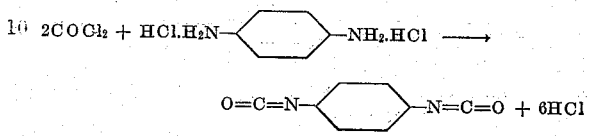

The ratio of reactants as shown above is that for the theoretical system where there would be no loss of reactants. But since phosgene is a low boiling material, there is some loss of this reactant during the removal of the by-product hydrogen chloride. Thus, for the best operating conditions, an excess of phosgene is desired. The process of this invention can be carried out on an industrial scale by the use of a 5% to 50% excess of phosgene over that indicated as being required by the above equations. The use of an excess of phosgene of even 100% to 200% or higher does not reduce the yields of the desired polyisocyanate. This excess of phosgene does not enter into the reaction, and can be recovered without an appreciable loss. In general the recovery of the unreacted phosgene can be 75% or above.

Although the invention has been referred to as involving reaction with phosgene, in its broadest conception the process of this invention includes the use of any other carbonyl dihalide such as carbonyl difluoride, carbonyl diiodide or carbonyl dibromide. As a practical matter phosgene (carbonyl dichloride) is greatly preferred. This preference is based in part on the present availability of the carbonyl dihalides and also on the fact that the hydrogen halide, HCl, resulting as a by-product when phosgene is employed is much more readily handled and disposed of than is hydrogen fluoride for example. It will be kept in mind, however, that even though the specific examples describe the use of only phosgene as a reactant, any of the other carbonyl dihalides can be substituted in the same preparation and substantially equivalent results will be obtained, taking into consideration the relative reactivities of the various halogens.

The above described reaction can be carried out in the presence of an inert solvent such as benzene, chlorobenzenes, toluene, and chlorotoluenes, among others, but it is not at all essential that a solvent be employed. Where no solvent is employed, the use of from 4 to 10 moles of phosgene per mole of the amine or its acid salt causes the reaction to proceed equally as well and to produce yields which are equivalent to those of the process employing inert solvent.

Any poly primary amine or its acid salt can be employed in the process of this invention. Since the reaction of phosgene with the primary amino group produces a volatile by-product, hydrogen chloride, as the isocyanato group is formed, the amine salt can be one derived from any volatile acid. It is preferred that the volatile acid be one which separates readily from $COCl_2$. Thus amine hydrochlorides and carbonates are the preferred acid salts with amine hydrochlorides being most preferred. This preference is governed only by the fact that the by-product, HCl, of this preferred reaction, can be recovered in aqueous solution and can be reused or sold free of other reaction by-products. Also, when polyamine hydrochloride is employed as a reactant, only one by-product need be removed from the reaction. Of course the use of the free amine as a reactant is most preferred, because the step of the preparation of the acid salt is not necessary and less volatile by-product need be removed from the pressure reaction.

As above stated any free poly primary amine can be employed in the process of this invention. These amines possess the general formula A—$(NH_2)_x$ where A is a polyvalent organic radical and $x$ is a number from 2 to 4. The preferred polyamines which possess this general formula are the ones wherein A is a polyvalent hydrocarbon group M, that is, the preferred polyamines posses the general formula M—$(NH_2)_x$. Polyamines which possess the general formula of the preferred amino reactants are the aliphatic di-, tri- and tetra-amines, including amines containing saturated and unsaturated straight and branched carbon chains as well as saturated and unsaturated cyclic hydrocarbon groups between the amino groups; aromatic di-, tri- and tetra-amines including those containing hydrocarbon substituents on nuclear ring carbon atoms; and hetero di-, tri- and tetra-amines. Specific members of this preferred class of amino reactants include among others such amines as methylene diamine; ethylene diamine; the propylene di-, tri- and tetra-amines; the hexamethylene di-, tri- and tetra-amines; 1,2-diamino ethylene; amylene tetra-amine; p-amino benzylamine; the phenylene diamines; xylene diamines; the naphthylene di-, tri- and tetra-amines; the fluorene di-, tri- and tetra-amines; the furane diamines; the biphenyl di-, tri- and tetra-amines; benzene triamine; anthroquinone diamine; anthracene di-, tri- and tetra-amines; 4,4'-diphenyl methane diamine; 4,4',4''-triphenyl methane triamine; 4,4',4'',4'''-tetraphenyl methane tetra-amine; cyclohexyl diamine, and the like.

It is not intended to exclude possible reactants for the process of this invention, the amines and their salts which contain reactive groups in the organic radical A, when there is employed as the amino reactant an amine or its salt which contains groups which will also react with phosgene, complex compounds linked or joined together by a carbonyl group will result. Nevertheless, such a complex compound will of course contain two or more isocyanate groups and will be therefore a polyisocyanate. Clearly then, such amino reactants are within the scope of the general class of amino reactants useful in the process of this invention.

The process of this invention need not be carried out at a pressure equal to the total vapor pressure of the reaction medium at the reaction temperature. Rather the process can be carried out at some predetermined lower pressure such as would be dictated by the limits of available pressure reaction equipment. Such operation can be achieved by withdrawing HCl at the predetermined pressure and at such a rate as to maintain that pressure. That such a means of following the process of this invention is not only operable but also produces high yields of the desired polyisocyanate will be hereinafter demonstrated in the specific examples.

The preparation of polyisocyanates described in the following specific examples was accomplished in a pressure reactor fitted with a charging port, a means for heating and cooling the reaction medium, a pressure gage, a thermowell for measuring the reaction temperature, a stirrer, and a vapor line for charging gaseous reactants. Connected to this reactor was a water-cooled partial condenser whose vapor outlet was closed by a venting valve while the vapor inlet was open to the reactor. The vapor outlet of the condenser was attached to a vapor line which contained a refrigerated trap followed by an HCl absorption unit.

In all of the examples which follow, the term "parts" is employed to indicate parts by weight.

The following example illustrates the most preferred embodiment of our process where a free polyamine is employed as the amino reactant in the preparation of a polyisocyanate.

Example I

There was added to an autoclave as described above 500 parts of benzene and 100 parts of paraphenylene diamine. This mixture was cooled to 20° C. by external cooling to facilitate the charging of phosgene. Then 239 parts of phosgene (a 30% excess) were charged into the autoclave and although an exothermic reaction started as soon as the phosgene entered the autoclave the 20° C. temperature was maintained until all the phosgene had been added. After all the phosgene was in, the reactants were heated to 120° C. The pressure in the autoclave was then 150 p. s. i. gage. The venting of HCl was started as soon as the reactants reached 120° C. As the reaction approached completion the reaction temperature was 150° C. In only 54 minutes after the heating of the reactants had started, the reaction had stopped as evidenced by the fact that no more HCl came off. The excess phosgene was removed from the reactor and recovered. The benzene solution remaining in the reactor was cooled to about 60° C., withdrawn, filtered and transferred to a vacuum still where the benzene was stripped off at a reduced pressure of about 10 to 100 mm. Hg absolute and the diisocyanate was distilled at 116° to 118° C. at 14 mm. Hg absolute. In this manner 155.7 parts, an 88.5% yield of p-phenylene diisocyanate was recovered.

The following specific examples illustrate the process of this invention where several different polyamine hydrochlorides are employed as the amino reactant to form corresponding polyisocyanates.

In Example II the pressure of the reaction was maintained at a substantially constant pressure below that of the total vapor pressure of the reaction medium.

Example II

To a reactor as hereinbefore described there was added 350 parts of benzene and 109 parts of anhydrous paraphenylene diamine hydrochloride (0.6 mole). The reactor was sealed, the mixture therein cooled to about 20° C. and 230 parts (2.32 moles) of phosgene were added to the autoclave. Some evidence of reaction was present as soon as phosgene was added. The reaction mixture was stirred and heated to 102° C. at which time the valve in the vent line to the refrigerated trap was opened gradually. Venting of HCl from the reflux condenser was maintained at a slow rate at first. The reaction temperature was increased slowly but never exceeded 141° C. While the reaction temperature was being increased, the rate of removal of HCl was increased to maintain a constant pressure of 150 pounds per square inch gauge. As the reaction neared completion the rate of removal of HCl was decreased to maintain the constant pressure. The total reaction time, that is the time elapsed between the addition of phosgene and up to the point where HCl no longer came off, was 128 minutes. The excess (unreacted) phosgene was removed and the reaction equipment was purged with nitrogen three times.

The benzene solution remaining in the reactor was cooled to about 50° C., withdrawn, filtered, and transferred to a vacuum still. One part by weight of benzene insoluble material was removed from the benzene solution. The benzene was removed from the filtered solution at reduced pressure. The residue, p-phenylene diisocyanate was distilled at 116° to 118° C. at 14 mm. Hg absolute. In this manner 90 parts, a 93.5% yield, of product identified as paraphenylene diisocyanate were recovered.

In the following examples the reaction pressure was allowed to reach a maximum and no attempt was made to maintain a constant reaction pressure.

Example III

In this preparation 109 parts of paraphenylene diamine hydrochloride and 475 parts (4.8 moles) of phosgene were employed but no solvent was used. The reactants were heated at 150° C. and the pressure reached 550 pounds per square inch gauge. Then HCl was vented as rapidly as possible without removing an appreciable amount of phosgene. One hundred eight minutes after the addition of the phosgene, no more HCl came off. The external application of heat was discontinued and the unreacted phosgene was removed. In this manner 76 parts, a 79% yield, of pure paraphenylene diisocyanate were prepared.

Example IV

Example III was repeated except that 662 parts (6.8 moles) of phosgene were employed. The total reaction time of this preparation was 90 minutes. After the unreacted phosgene was removed, there was obtained 86.2 parts, a 90% yield of paraphenylene diisocyanate.

Example V

In this preparation benzene was employed as the reaction diluent and the quantities of reactants were 109 parts of paraphenylene diamine hydrochloride and 315 parts (3.2 moles) of phosgene. The reactants were heated to 150° C. with a resulting gauge pressure of 550 pounds per square inch then the vent was opened and HCl removed as rapidly as possible. The total reaction time was 121 minutes. After the unreacted phosgene was removed, the resulting benzene solution was cooled to 60° C., filtered and the filtrate transferred to a still where the benzene was stripped off at reduced pressure. From the residue there was recovered by distillation 91 parts, a yield of 95% of paraphenylene diisocyanate at 116° to 118° C. at 14 mm. Hg absolute.

Example VI

To a reactor as hereinabove described there was added 92 parts of anhydrous metaphenylene diamine hydrochloride, and 350 parts of benzene. These materials were cooled to 20° C. as before and 248 parts (2.5 moles) of phosgene were then added to the reactor. This mixture was stirred and heated. When the mixture reached about 125° to 130° C. the pressure increased sharply, indicating the liberation of HCl. The vent valve was opened and HCl removed as rapidly as possible without removal of phosgene beyond the refrigerated trap. The maximum pressure during the reaction was 358 pounds per square inch gauge. The total reaction time was 73 minutes. After removing the unreacted phosgene, the hot benzene solution (60° C.) was filtered, the filtered solution was charged to a still pot, and the benzene was removed at reduced pressure. The benzene insoluble material removed by filtration was 1.8 parts. There was recovered by distillation at 102° to 104° C. at 8 mm. Hg absolute 93.7 parts, a yield of 97.8%, of a product identified at metaphenylene diisocyanate.

Example VII

To a reactor as hereinbefore described there was added 105 parts of 2,5-toluene diamine hydrochloride (0.60 mole), 350 parts of benzene and 257 parts (2.6 moles) of phosgene in the same order and manner as previously described. This mixture was stirred and heated. At about 130° C. the pressure increased sharply, indicating liberation of HCl. The vent valve was opened and HCl removed as rapidly as possible without removal of phosgene beyond the refrigerated trap. The maximum pressure during this reaction was 195 pounds per square inch at a maximum temperature of 137° C. The total reaction time in this preparation was 118 minutes. After removal of the unreacted phosgene, the benzene solution was cooled to 60° C. and filtered, the filtrate charged to a still pot, and the benzene was removed at reduced pressure. The benzene insoluble material removed by filtration was 1.1 parts. There was recovered from the residue by distillation at 132° C. at 14 mm. Hg absolute 97 parts, a yield of 92.8% of a product identified as 2,5-tolylene diisocyanate.

Example VIII

To a reactor as hereinbefore described there was added 132 parts of 4,4',4''-tri(phenylamino) methane trihydrochloride, and 436 parts of benzene. This mixture was cooled to 20° C. and then 198 parts of phosgene were added. This mixture was stirred and heated. When the pressure increased sharply indicating liberation of HCl, the vent valve was opened and HCl removed as rapidly as possible without removal of phosgene beyond the refrigerated trap during this drawoff period. The maximum temperature during this reaction was 139° C. while the maximum pressure during the reaction was 450 pounds per square inch gauge. The total reaction time of this preparation was 86 minutes. After removal of the unreacted phosgene, the hot benzene solution was filtered, the filtrate charged to a still pot and the benzene was removed at reduced pressure. A yield in excess of 90% of 4,4',4''-triphenyl methane triisocyanate was obtained.

*Example IX*

To a reactor as hereinbefore described there was added 140 parts of 1,5-diamino naphthalene hydrochloride (0.60 mole), 350 parts of benzene and 248 parts (2.5 moles) of phosgene in the order and manner as previously described. This mixture was stirred and heated. When the pressure in the reactor increased sharply, indicating the liberation of HCl, the vent valve was opened and HCl removed as rapidly as possible. Again no phosgene was removed beyond the refrigerated trap. The maximum pressure during this reaction was 378 pounds per square inch gauge at a maximum temperature of 141° C. A total reaction time of 123 minutes was all that was required to reach the point where all the HCl that formed had been removed. The unreacted phosgene was removed. Then the hot benzene solution was cooled to 60° C., removed from the reactor, filtered and heated to evaporate the benzene at a controlled rate to recover the product by crystallization. In this manner 76 parts of 1,5-naphthalene diisocyanate were recovered, representing a yield of only 60.8%, but a considerable amount of the product remained in solution. The crystallized product recovered had a melting point of 129° to 130.5° C.

*Example X*

To a reactor as hereinbefore described there was added 113 parts of 1,6-n-hexane diamine hydrochloride (0.6 mole), 350 parts of benzene and 238 parts (2.4 moles) of phosgene in the order and manner as previously described. This mixture was stirred and heated. When the pressure of the reactor increased sharply indicating the liberation of HCl the vent valve was opened and HCl removed as rapidly as possible. Again no phosgene was removed beyond the refrigerated trap. The maximum pressure during this reaction was 490 pounds per square inch gauge and the maximum temperature 192° C. Although at first this reaction appeared to be going very slowly, if at all, there was a sudden increase in the reaction and after only 45 minutes no further HCl came off. The unreacted phosgene was then removed from the reactor and the hot benzene solution after cooling to 60° C. was filtered. There was a considerable amount of polymeric benzene-insoluble material present. The filtered benzene solution was charged to a still pot and the benzene was removed at a reduced pressure. The residue was a liquid with some undissolved solid polymeric material. The material remaining in the still pot was distilled at 130° to 135° C. at 14 mm. Hg absolute and in this manner 55.4 parts, a yield of 55% 1,6-n-hexane diisocyanate, a colorless liquid, was recovered. Higher yields of this polyisocyanate are obtained by avoiding the long induction period and long heat history.

*Example XI*

To a reactor as hereinbefore described there was added 180 parts (0.7 mol) of para-para' biphenyl diamine hydrochloride, 350 parts of benzene and 277 parts (2.8 moles) of phosgene in the order and manner as previously described. This mixture was stirred and heated. When the mixture was at 96° C. there was a spontaneous increase in temperature to 145° C. with a corresponding rise in reaction pressure to 515 pounds per square inch gauge. The vent valve was opened and HCl was removed as rapidly as possible. This reaction required a total reaction time of 95 minutes. The unreacted phosgene was removed and the hot benzene solution was cooled to 60° C., removed from the reactor and filtered. A very small quantity of benzene insoluble material, 1.1 parts, was removed. The filtered hot benzene solution was then transferred to a still pot and the benzene was stripped off at reduced pressure. The weight of the residual product in the still was 165.2 parts representing a 100% yield. This material was redissolved in benzene, treated with activated carbon and purified by recrystallization from the benzene. By collecting two crystal crops, 138 parts, an 83.7% yield of purified 4,4'-biphenyl diisocyanate was recovered. This material had a melting point of 107.5 to 109° C.

The total reaction time reported in Examples I to XI can be substantially reduced by increasing the capacity of the reflux condenser (the partial condenser operating under pressure). Also the total reaction time can be reduced by venting the HCl to the atmosphere. By a combination of these two modifications, the removal of HCl and the total reaction time can both be reduced to a time of about 15 to 30 minutes. This is especially true where phosgene is reacted with the free amine, for it has been our experience that the reaction of phosgene and the polyamine under the conditions of the process of this invention is extremely rapid, beginning when the phosgene is added to the cooled amino reactant and proceeding quite rapidly as the reactants are heated.

The free amines of the amine hydrochlorides employed as the amino reactants in Examples II to XI can be substituted as equivalent reactants and will result in a slightly increased yield. Any of the other polyamines of the class hereinbefore set forth or their hydrochlorides can be employed as the amino reactant in place of those used in the foregoing specific examples. Likewise, chlorobenzenes, toluene, chlorotoluenes and other solvents for and inert to phosgene can be employed in place of benzene as the reaction diluent. The manner in which the desired polyisocyanate is recovered from the reaction medium can be varied. For example, the inert solvent can be stripped off and the polyisocyanate remaining in the still pot merely removed. In some cases where the polyisocyanate does not decompose the still pot residue can be distilled at reduced pressures of from 1 to 20 mm. of mercury or lower to give the polyisocyanate in highly purified form. Also, the polyisocyanate can be dissolved in an inert solvent and be recovered in a very pure form by evaporating the solvent and crystallizing the polyisocyanate, but here there is likely to be a loss of product, since recovery by recrystallization is in general not always complete.

Having disclosed our invention by means of specific examples, we do not desire thereby to limit ourselves solely thereto for, as hitherto stated, the precise proportions of the reactants and solvents can be varied and equivalent reactants employed if desired without departing from the spirit and scope of this invention as defined in the appended claims.

We claim:

1. The method for preparing organic polyisocyanates which comprises mixing together in a closed system an excess of a carbonyl dihalide with a poly primary amino compound, heating these reactants at a temperature of 100° C. to 200° C. at superatmospheric pressure, removing the volatile reaction by-products during the course of the reaction, removing the unreacted carbonyl dihalide, and recovering the polyisocyanate.

2. The method for preparing organic polyisocyanates which comprises mixing together in a closed system in an inert reaction diluent an excess of a carbonyl dihalide with a poly primary amino compound, heating these reactants at a temperature of 100° C. to 200° C. at superatmospheric pressure, removing the volatile reaction by-products during the course of the reaction, removing the unreacted carbonyl dihalide, and recovering the polyisocyanate.

3. The method of preparing organic polyisocyanates which comprises mixing together in a closed system an excess of phosgene with a compound selected from the class consisting of poly primary amines and acid salts of poly primary amines, heating these reactants at a temperature of 100° C. to 200° C. at superatmospheric pressure, removing the volatile reaction by-products substantially as rapidly as formed, removing the unreacted phosgene, and recovering the polyisocyanate.

4. The method for preparing organic polyisocyanates which comprises mixing together in a closed system an excess of phosgene with a compound selected from the class consisting of poly primary amines and acid salts of poly primary amines at a temperature from 10° C. to 30° C., heating these reactants to a temperature from about 100° C. to 200° C. and at a pressure of from about four atmospheres to that corresponding to the total vapor pressure of the reaction medium at the reaction temperature, removing the volatile reaction by-products substantially as rapidly as formed while substantially retaining the phosgene within the closed system, then removing the unreacted phosgene and recovering the polyisocyanate.

5. The method for preparing organic polyisocyanates which comprises mixing together in a closed system an excess of phosgene with a member selected from the class consisting of poly primary amines and acid salts of poly primary amines at a temperature of from 10° to 30° C., heating these reactants to a temperature from about 100° C. to 200° C. and at a pressure of from about four atmospheres to that corresponding to the total vapor pressure of the reaction medium at the reaction temperature, removing the volatile reaction by-products substantially as rapidly as formed, removing the unreacted phosgene, and recovering the polyisocyanate.

6. The method for preparing organic polyisocyanates which comprises mixing together in a closed system an excess of phosgene with a poly primary amine at a temperature of from 10° C. to 30° C., heating these reactants to a temperature of from 100° to 200° C. and at a pressure of from about four atmospheres to that corresponding to the total vapor pressure of the reaction medium at the reaction temperature, removing the HCl by-product substantially as rapidly as formed, removing the unreacted phosgene, and recovering the polyisocyanate.

7. The method for preparing organic polyisocyanates which comprises mixing together in a closed system an excess of phosgene with a hydrochloride salt of a poly primary amine at a temperature of from 10° to 30° C., heating these reactants to a temperature of from 100° to 200° C. and at a pressure of from about four atmospheres to that corresponding to the total vapor pressure of the reaction medium at the reaction temperature, removing the HCl by-product substantially as rapidly as formed, removing the unreacted phosgene, and recovering the polyisocyanate.

8. The method for preparing organic polyisocyanates which comprises adding an excess of phosgene to a mixture of an inert reaction diluent and a poly primary amine in a closed system at a temperature of from 10° C. to 30° C., heating this mixture to a temperature of from 100° to 200° C. and at a pressure of from about four atmospheres to that corresponding to the total vapor pressure of the reaction medium at the reaction temperature, removing the HCl by-product substantially as rapidly as formed, removing the unreacted phosgene, and recovering the polyisocyanate.

9. The method for preparing organic polyisocyanates which comprises adding an excess of phosgene to a mixture of an inert reaction diluent and a hydrochloride salt of a poly primary amine in a closed system at a temperature of from 10° to 30° C., heating this mixture to a temperature of from 100° to 200° C. and at a pressure of from about four atmospheres to that corresponding to the total vapor pressure of the reaction medium at the reaction temperature, removing the HCl by-product substantially as rapidly as formed, removing the unreacted phosgene, and recovering the polyisocyanate.

10. The process of claim 8 where the inert reaction diluent is benzene.

11. The process of claim 9 where the inert reaction diluent is benzene.

12. The method for preparing p-phenylene diisocyanate which comprises adding an excess of phosgene to a mixture of benzene and p-phenylenediamine in a closed system at a temperature of from 10° C. to 30° C., heating this mixture to a temperature of from 100° to 200° C. and at a pressure of from about four atmospheres to that corresponding to the total vapor pressure of the reaction medium at the reaction temperature, removing the HCl substantially as rapidly as formed, removing the unreacted phosgene, and recovering p-phenylene diisocyanate.

13. The method for preparing phenylene diisocyanates which comprises adding an excess of phosgene to a mixture of benzene and phenylene diamine hydrochloride in a closed system at a temperature of from 10° to 30° C., heating the mixture at a temperature of from 100° to 200° C. and at a pressure from about 4 atmospheres to that corresponding to the total vapor pressure of the reaction medium at the reaction temperature, removing the HCl substantially as rapidly as formed, removing the unreacted phosgene, and recovering the phenylene diisocyanate.

14. The method for preparing naphthalene diisocyanates which comprises adding an excess of phosgene to a mixture of benzene and a naphthalene diamine hydrochloride in a closed system at a temperature of from 10° to 30° C., heating this mixture to a temperature of from 100° to 200° C. and at a pressure of from about 4 atmospheres to that corresponding to the total vapor pressure of the reaction medium at the reaction temperature, removing the HCl substantially as rapidly as formed, removing the unreacted phosgene, and recovering the naphthalene diisocyanate.

15. The method for preparing 2,5-tolylene diisocyanate which comprises adding an excess of phosgene to a mixture of benzene and 2,5-toluene diamine hydrochloride in a closed system at a temperature of 10° C. to 30° C., heating this mixture to a temperature of from 100° C. to 200° C. and at a pressure of that substantially equal to the vapor pressure of the reaction medium at the reaction temperature, removing the HCl substantially as rapidly as formed, removing the unreacted phosgene, and recovering the 2,5-tolylene diisocyanate.

16. The method of preparing 1,6-hexamethylene diisocyanate which comprises mixing an excess of phosgene with a mixture of benzene and 1,6-hexamethylene diamine hydrochloride in a closed system at a temperature of from 10° to 30° C., heating this mixture to a temperature of from 100° C. to 200° C. and at a pressure substantially equal to the total vapor pressure of the reaction medium at the reaction temperature, removing the HCl substantially as rapidly as formed, removing unreacted phosgene, and recovering the 1,6-hexamethylene diisocyanate formed.

MARION G. MORNINGSTAR.
CHARLES S. SCHOLLENBERGER.
GRANT E. STUEBER.

References Cited in the file of this patent
UNITED STATES PATENTS

| Number | Name | Date |
| --- | --- | --- |
| 2,374,340 | Farlow | Apr. 24, 1945 |

OTHER REFERENCES

Ser. No. 405,992, Rinke et al. (A. P. C.), published Apr. 20, 1943.